(12) United States Patent
Begin

(10) Patent No.: US 10,219,440 B1
(45) Date of Patent: Mar. 5, 2019

(54) LANDSCAPING DEVICE

(71) Applicant: Laurence C. Begin, Milford, MI (US)

(72) Inventor: Laurence C. Begin, Milford, MI (US)

(*) Notice: Subject to any disclaimer, the term of this patent is extended or adjusted under 35 U.S.C. 154(b) by 201 days.

(21) Appl. No.: 13/954,933

(22) Filed: Jul. 30, 2013

Related U.S. Application Data

(63) Continuation of application No. 12/148,052, filed on Apr. 15, 2008, now abandoned.

(51) Int. Cl.
*A01G 2/00* (2018.01)
*A01G 9/28* (2018.01)

(52) U.S. Cl.
CPC *A01G 2/00* (2018.02); *A01G 9/28* (2018.02)

(58) Field of Classification Search
CPC ............................. A01G 1/08; A01G 13/0256
USPC ............................................................ 47/33
See application file for complete search history.

(56) References Cited

U.S. PATENT DOCUMENTS

| | | | |
|---|---|---|---|
| 1,139,515 A | 5/1915 | Haas | 52/102 |
| 1,195,697 A | 8/1916 | Lord | 52/102 |
| 1,257,768 A | 2/1918 | Turner et al. | 473/490 |
| 1,961,580 A | 6/1934 | Brown | 404/12 |
| 2,127,233 A | 8/1938 | Older | 404/12 |
| 3,384,351 A | 5/1968 | Turner, Jr. | 256/32 |
| 3,411,977 A | 11/1968 | Slater, Jr. | 428/33 |
| 3,484,989 A | 12/1969 | Lazinsky | 47/33 |
| 3,495,352 A | 2/1970 | Sbare | 47/33 |
| 3,515,373 A | 6/1970 | Abbe | 256/32 |
| 3,676,952 A | 7/1972 | Watts | 47/33 |
| 5,048,241 A | 9/1991 | Gavin, Jr. | 52/102 |
| 5,544,445 A | 8/1996 | Mantilla | 47/33 |
| 6,233,867 B1 | 5/2001 | Gibson | |
| 6,336,290 B1 | 1/2002 | Callan | 47/33 |
| 6,354,038 B1 | 3/2002 | Morris | 47/33 |
| 6,446,400 B1 | 9/2002 | Block et al. | 52/102 |
| 6,754,989 B2 | 6/2004 | Eicher | 47/32 |
| 7,144,201 B2 | 12/2006 | DeArmond, Jr. | 405/286 |
| 7,306,402 B2 * | 12/2007 | Graber | A01G 1/08 405/121 |
| 2001/0045056 A1 | 11/2001 | Hulett | 47/33 |
| 2005/0102893 A1 | 5/2005 | O'Connor | 47/33 |
| 2009/0165372 A1 | 7/2009 | Smart | 47/33 |

* cited by examiner

*Primary Examiner* — Trinh T Nguyen
(74) *Attorney, Agent, or Firm* — L.C Begin & Associates, PLLC

(57) ABSTRACT

The present invention includes a landscaping apparatus for inhibiting plant growth on the ground, the apparatus containing a member including an elongated strip having a longitudinal axis and sides spaced apart from the longitudinal axis, wherein the longitudinal axis and the sides are substantially within a plane containing the member when the member is substantially flat. One or more projections extend from the member and are used to fix the member to the ground by inserting the projections into the ground. In one embodiment, the projections are integrally formed with the member and the member is made from a substantially flexible material.

18 Claims, 7 Drawing Sheets

LANDSCAPING DEVICE

CROSS-REFERENCE TO RELATED APPLICATIONS

This application is a continuation of coowned and copending U.S. patent application Ser. No. 12/148,052 having a filing date of Apr. 15, 2008.

TECHNICAL FIELD

The invention relates to landscaping apparatuses used to inhibit plant growth such as grass, weeds, etc., on ground near buildings and other places.

BACKGROUND

Grass, weeds and other plant growth near buildings, trees, shrubs, flowers, rocks, walkways, etc. present a homeowner or landscaper with numerous problems when attempting to maintain a lawn or garden area. These undesired plants are a constant bother within the maintained portion of a yard and around the perimeter of a building. The larger the maintained area of a yard or home, the more time consuming and expensive it becomes to care for it. Therefore it is advantageous to actively prevent undesired plants from growing in these places. Herbicides are frequently turned to for controlling weeds, but have cost, health and environmental considerations associated with them.

Alternatively, trimming of the weeds, typically by utilizing an electronically or gasoline-powered "weed whacker" implicates the use of carbonaceous fuels that when considered in the aggregate may contribute to gaseous emissions potentially detrimental to the environment. Furthermore, trimming of the weeds is often a time-consuming operation when maintaining the surrounding landscape. The present invention addresses the problems above in a cost-effective and environmentally responsible manner.

SUMMARY

The present invention is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections may be integrally formed with the member, or formed separate therefrom. As described below, the projections may be adjusted to be angularly oriented relative to the plane referred to above, thereby facilitating insertion of the projections into the ground.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the sides are substantially parallel to the longitudinal axis.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the plurality of projections has at least a portion of the projections substantially within the plane and extending from the sides in a direction away from the longitudinal axis.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the member is made from a substantially flexible material.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the member is made from a substantially flexible material, wherein the material is selected from the group consisting of polymers and metals.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the plurality of projections has at least a portion of the projections extending outside of the plane.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the plurality of projections has at least a portion of the projections substantially outside the plane, further wherein the at least the portion of the projections are substantially perpendicular to the plane and extend from the member in the same direction.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the plurality of projections has at least a portion of the projections substantially outside the plane, further wherein the at least the portion of the projections are substantially perpendicular to the plane and extend from the member in the same direction, further wherein the at least the portion of the projections extend from the sides.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the plurality of projections has at least a portion of the projections substantially outside the plane, wherein the member is made from a substantially rigid material.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the plurality of projections has at least a portion of the projections substantially outside the plane, wherein the member is made from a substantially rigid material, wherein the material is selected from the group consisting of polymers and metals.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the member further comprises at least one removable portion scored on the member, wherein the at least one removable portion may be selectively removed by a user of the landscaping apparatus so that the member substantially abuts an obstacle in an intended path for the member along the ground.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the projections are substantially shaped as barbs.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the projections are substantially shaped as sawteeth.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the member is made from a material comprising a recycled plastic or a plurality of recycled plastics. Alternatively, the member may also be made of any other recycled materials, metal for example, or cured paint solids as another example.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, wherein the member further comprises at least one aperture, wherein the at least one aperture facilitates the use of at least one anchor to substantially secure the landscaping apparatus to the ground.

The present invention according to another embodiment is a landscaping apparatus for inhibiting plant growth on ground, comprising a member comprising an elongated strip having a longitudinal axis and sides spaced apart from the longitudinal axis, wherein the longitudinal axis and the sides are substantially within a plane containing the member when the member is substantially flat, and a plurality of projections extending from the member, wherein the projections are integrally formed with the member, further comprising at least one anchor to substantially secure the landscaping apparatus to the ground.

The present invention according to another embodiment is a landscaping apparatus, comprising a first member comprising an elongated strip having a longitudinal axis, wherein the longitudinal axis is substantially within a plane containing the first member when the first member is substantially flat, and a channel connected to the first member, wherein the channel is substantially parallel to the longitudinal axis, and a second member comprising an elongated rod having a plurality of projections, wherein the second member may be inserted into the channel, wherein the plurality of projections has at least a portion of the projections substantially outside the plane when the second member is inserted into the channel.

The present invention according to another embodiment is a landscaping apparatus, comprising a first member comprising an elongated strip having a longitudinal axis, wherein the longitudinal axis is substantially within a plane containing the first member when the first member is substantially flat, and a channel connected to the first member, wherein the channel is substantially parallel to the longitudinal axis, and a second member comprising an elongated rod having a plurality of projections, wherein the second member may be inserted into the channel, wherein the plurality of projections has at least a portion of the projections substantially outside the plane when the second member is inserted into the channel, wherein the at least the portion of the projections are substantially perpendicular to the plane when the second member is inserted into the channel.

The present invention according to another embodiment is a landscaping apparatus, comprising a first member comprising an elongated strip having a longitudinal axis, wherein the longitudinal axis is substantially within a plane containing the first member when the first member is substantially flat, and a channel connected to the first member, wherein the channel is substantially parallel to the longitudinal axis, and a second member comprising an elongated rod having a plurality of projections, wherein the second member may be inserted into the channel, wherein the plurality of projections has at least a portion of the projections substantially outside the plane when the second member is inserted into the channel, wherein the channel further comprises at least one feature for substantially retaining the second member within the channel when the second member is inserted therein.

The present invention according to another embodiment is a method of using a landscaping apparatus for inhibiting plant growth on ground, comprising providing a member comprising an elongated strip having a longitudinal axis and sides spaced apart from the longitudinal axis, wherein the longitudinal axis and the sides are substantially within a plane containing the member when the member is substantially flat, providing a plurality of projections extending from the member, wherein the projections are integrally formed with the member, forming the plurality of projections substantially perpendicular (or at least angularly oriented) to the plane so that the plurality of projections extend from the member in the same direction, and substantially securing the landscaping apparatus to the ground by pushing the projections into the ground, wherein the landscaping apparatus covers a portion of ground and inhibits plant growth on the portion of ground.

DESCRIPTION

Figure 1:
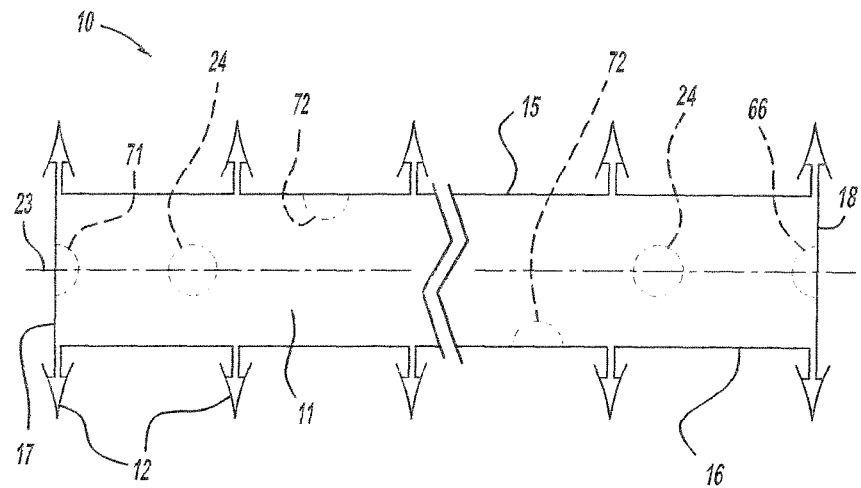
FIG. 1 is a top view of one embodiment of the invention.

Referring to FIG. 1, the invention is a landscaping apparatus 10 comprising an elongated strip or member 11 having a plurality of projections 12 extending therefrom. (Note: single and/or plural members are implied, as appropriate, throughout this description.) The strip may be formed from a wide variety of metallic and nonmetallic materials. Possible metallic materials include various alloys and gauges of aluminum, such as those typically used for siding or gutters for houses. Possible nonmetallic materials include wood that has been chemically treated for outdoor use with chromated copper arsenate, ammonium copper quaternary, copper boron azole, or other preservatives. Other possible nonmetallic materials include polymers such as polyethylene (PE), polyvinyl chloride (PVC), polypropylene (PP), and acrylate-butadiene-styrene (ABS). Whatever material and construction is selected, the resulting member must have limited porosity, as one of the main goals is to provide a barrier to the growth of weeds, grass and undesired plants. One possible material is recycled plastic, such as that used to fabricate picnic table surfaces and sidewalk materials. Recycled plastics may also include recycled polyethylene (PE), polyvinyl chloride (PVC), polypropylene (PP), and acrylate-butadiene-styrene (ABS). Alternatively, the plastic may utilize recycled paint solids by, for example, blending latex paint solids with high-density polyethylene (HDPE) or polymethyl methacrylate (PMMA). If plastic is used, it may be either a thermosetting or thermoplastic type.

The member or members may be formed by injection molding, for example, or other known methods. Alternatively, they may be continuously extruded into long strips or sheets and then cut to a desired outline, with any scrap material reused (if possible) for production within the manufacturing facility.

The member may be molded or painted in various colors, as best suits the various intended applications. For example, it may be molded or painted in a dark green ("forest green"), to blend with or appear similar to a well-maintained grass lawn. The member may be white, similar to other kinds lawn and garden items, such as trellises, flower boxes, bird feeders, etc. The color may be a reddish, brown color, similar to the color of bricks or walkway tiles. The member may be substantially clear, to preserve the appearance of the ground. To this end, the material may be opaque, to permit some of the underlying color to be seen. The color may be a neutral color such as, for example, whatever the base color is for the recycled plastic that is used, in order to lower the cost of the final product by eliminating the need for a colorant. The color (and surface texture) may be whatever is suitable for painting according to the preference of the user of the invention.

The member may be formed of a substantially flexible material, allowing the member to substantially assume the shape of the ground upon which it rests. For example, the member may be formed during installation by a user into depressions and over rises in the ground to achieve a pleasing, well-finished visual appearance. It also permits the user to deform the projections (described further herein) as necessary, in order for them to be oriented so as to penetrate the ground and retain the member in a desired location. Furthermore, the substantially flexible material permits the member to be cut-to-size with scissors by the user, to form sections having selected lengths, angles, etc. In this way, the user may arrange and install the member to its greatest efficiency and advantage (i.e. around obstacles such as small trees, close to angle walkways, etc.). Finally, the substantially flexible member may be rolled up, for efficiency of space for shipping, transportation, storage, etc.

Figure 3:
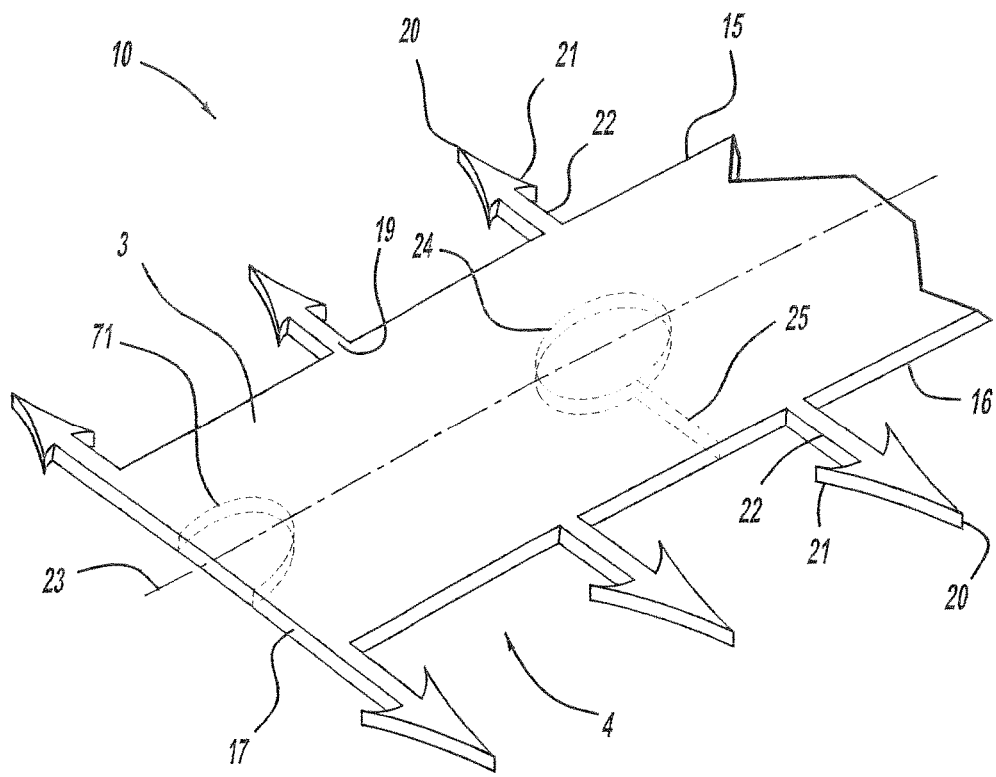
FIG. 3 is an isometric view of the embodiment of FIG. 1.
Figure 4:
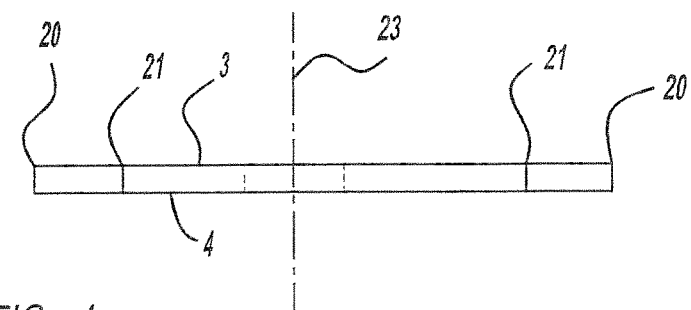
FIG. 4 is an end view of the embodiment of FIG. 1.

Referring to FIGS. 3-4, the member has lower and upper surfaces 13, 14, respectively. The lower surface contacts the ground upon which the member lays. The upper surface is opposite the lower surface, and is generally visible to a person after the member is installed. The lower and upper surfaces may have substantially the same texture, or substantially different textures. For example, the upper surface may have a "roughened" appearance; a subtle pattern; or a decorative pattern such as geometric shapes, leaves, twigs, etc. A textured surface may be desirable in order to break up the "plain" appearance of a strip of plastic laying next to shrubs, etc., or to simply appeal to potential buyers of the landscaping apparatus. Furthermore, a textured surface may be used which is slip-resistant for people walking on it. To lower production costs, the surfaces may have a substantially smooth texture or simply be "as formed" during manufacturing. As explained below, the dimensions of the member may be tailored as desired.

The thickness of the member may be any thickness sufficient to provide adequate durability for handling by the user, or to accommodate the weight of a lawnmower or lawn tractor, etc., while also thin enough to permit cutting with scissors or heavy-duty shears. Alternatively, for a plastic member, the thickness may be about 1/16 inch (in.) to about 5/8 in. Alternatively, for a plastic member, the thickness may be about 1/8 in. to about 1/2 in. Alternatively, for a plastic member, the thickness may be about 1/8 in. to about 3/8 in. Alternatively, for a plastic member, the thickness may be about 1/8 in. to about 1/4 in. Alternatively, for a metal member the thickness may be less than about 0.100 in. Alternatively, for a metal member the thickness may be less than about 0.060 in.

The width of the member (minus the projections, described further herein) may be any desired width. Alternatively, the width of the member may be about 1 in. to about 24 in. Alternatively, the width of the member may be about 2 in. to about 18 in. Alternatively, the width of the member may be about 3 in. to about 12 in. Alternatively, the width of the member may be about 4 in. to about 8 in.

The length of a member may be any length that may be feasibly supplied in the form of a roll. Alternatively, the member may be supplied in a length of less than about 200 feet (ft.). Alternatively, the member may be supplied in a length of less than about 100 ft. Alternatively, the member may be supplied in a length of less than about 50 ft. Alternatively, the member may be supplied in sections having lengths of about 1 ft. to about 20 ft. Alternatively, the member may be supplied in sections having lengths of about 2 ft. to about 10 ft. Alternatively, the member may be supplied in sections having lengths of about 3 ft. to about 6 ft. The sections may be supplied substantially flat or in the form of rolls.

One of the difficult areas to control weeds is at the bottom of the outside walls of a building. Here they require extra efforts to be rooted out. Referring to FIGS. 1 and 3, the present invention has first and second sides 15, 16, respectively. In one embodiment these sides are substantially straight, and substantially parallel (except for the barbs described herein). Therefore, in one application of the invention, one of the sides may be located adjacent to the interface between an exterior wall and the ground, forming a skirt. This will limit the area in which weeds will be able to grow, with a decrease in manual effort needed for landscaping. In another embodiment, the sides are not substantially straight, and may have a repeating geometric or wave pattern. In another embodiment the sides have a selected radius, arc or curvature, so that the member may be advantageously positioned with respect to a curved sidewalk, flower bed, etc. Member 11 has first and second ends, 17, 18, respectively, either or both of which may abut another section of the apparatus (not shown).

The landscaping apparatus may also be used in a wide variety of other lawn and garden situations, in addition to next to the bottom of an exterior wall. In order to reduce the amount of lawn mowing which a homeowner must pay for or do themselves, the invention may be used in areas of the lawn that are difficult to mow, or are simply not a priority because of location or other reasons. This would include along cement sidewalks and driveways, adjacent to road shoulders, and in the "raised" region around the base of some mature trees ("raised" due to the root structure. For this case, the member may be formed as arcuate sections having a radius of about 8 in. or more, in order to fit around the base of the tree.) Some of these situations require that the material of the member(s) be quite flexible, as described herein. In other cases, for example, where push lawnmowers or riding lawn tractors are intended to be driven over or along the member, a thicker and/or tougher plastic will be necessary, to have the required rigidity and durability. The flat contour of the member when fixed against a substantially level area of ground permits the operator of a lawnmower to drive over the member to ensure a trim cut without weed whacking.

In at least one embodiment, the member may be of a monolithic, i.e. unitary, construction having no separate pieces to assemble, misassemble, lose, etc. Stated another way and meaning the same thing, the member may be formed to contain one or more projections "integrally formed" with the member. This reduces the cost of production and improves the packaging of the product, as well as simplifying its use by the landscaper.

Using the invention will help to reduce the burden on the environment. By permitting fewer weeds to grow to begin with, the use of internal combustion engine devices such as weed trimmers and mowers will be lessened, lowering noise levels and consuming less gasoline and lowering emissions of "greenhouse gases" which contribute to the phenomenon known as global warming. Furthermore, the need for chemical weed killers is mitigated. When the invention is made of recycled plastics, fewer fossil fuel resources will be needed as raw materials for plastic, as well as for the heat and electricity to process new plastic.

Referring again to FIG. 1, plurality of projections 12 may be integrally formed at 19 with elongate member 11. The elongate member has longitudinal axis 23. The longitudinal axis is substantially within a plane (not shown) containing elongate member 11 when the elongate member is substantially flat. The projections may be spaced in numerous configurations: in-line with each other, staggered, etc. The distance between projections may vary as desired. The distance may be about 1 in. to about 20 in. Alternatively, the distance may be about 2 in. to about 18 in. Alternatively, the distance may be about 3 in. to about 16 in. Alternatively, the distance may be about 4 in. to about 14 in. Referring to FIG. 3, each projection is comprised of a penetrating tip 20, a barb portion 21 and a shank portion 22. The projection can be of numerous geometries. For example, the projections may be substantially shaped as arrowheads. In another example, the projections may be substantially shaped as barbs (i.e. similar to arrowheads, but with more pronounced edge features in the region where the barb portion is joined to the shank, such that the more pronounced edge features have a greater tendency to be retained by making retraction of the projection somewhat more difficult than it may be for an arrowhead). The purpose of the projection is to restrain shifting of the member from its intended and installed position on the ground. The penetrating tip may be sufficiently sharp so as to permit relatively easy insertion into the ground using the user's hand or foot. In another embodiment the member is not of unitary construction, and the penetrating tip is comprised of a different, typically more durable material, which makes the tip more capable of being inserted successfully into harder ground. In order to insert the tip into the ground, the user manually deforms the integral projection to an orientation that is substantially perpendicular with respect to the plane or at least angularly oriented thereto. When the member is made of plastic, it may exhibit a "shape memory" and tend to spring back to its original orientation as-formed during manufacturing (i.e. within the plane of the member). Therefore the user will preferably do a section of landscaping at a time so as to permit manually deforming all of the projections, properly locating the member on the ground and around any existing obstacles, and inserting the projections into the ground—all before the projections spring back excessively and so as to encumber the member from being properly secured. In the event that that one or more projections have substantially returned to their original position, they may be repeatedly manually formed as needed.

Figure 2:
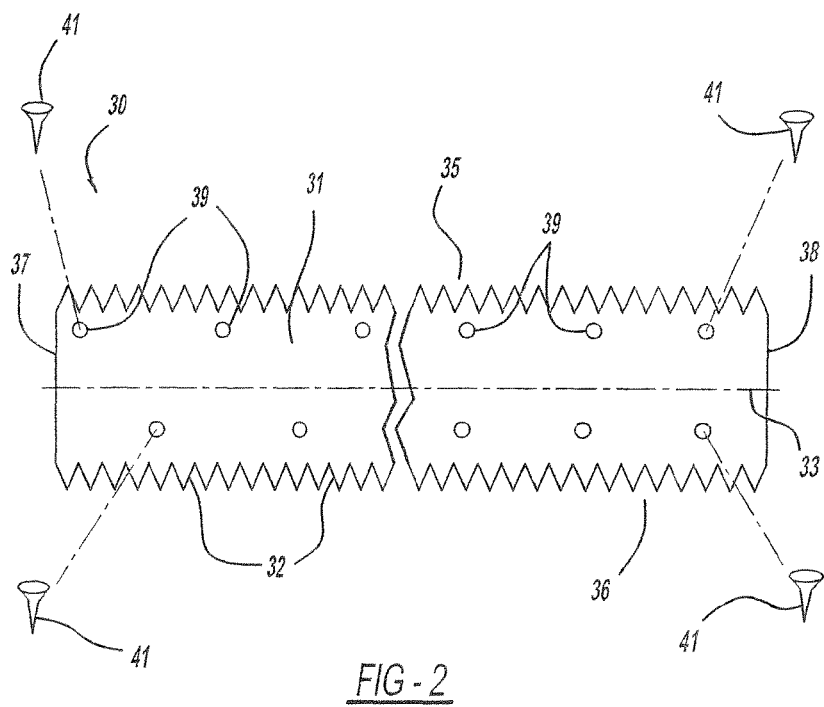
FIG. 2 is a top view of another embodiment of the invention.

In another embodiment, referring to FIG. 2, a landscaping apparatus 30 comprises an elongated, flexible strip or member 31 having a plurality of projections 32 and a longitudinal axis 33. Projections 32 substantially in the form of serrations as, for example, sawteeth may be located along first and second sides 35, 36, respectively. Member 31 has first and second ends, 37, 38, respectively, either or both of which may abut another section of the apparatus (not shown). The materials and geometries for other embodiments described herein may also be applied to member 31.

Referring again to FIG. 2, at least one peg, spike, nail, pin, dowel, staple, separate barb, or other anchoring device 41, may be aligned with at least one prefabricated or prescored portion or aperture 39 extending through a member such as, for example, 31 to permit additional retention of the member. Alternatively, these types of fasteners 41 may be driven through a member 31 into the ground using a hammer or mallet, because the member is sufficiently flexible to permit it. These types of fasteners 41 may be used in place of, or in combination with, projections 32 formed integrally with the member.

Stated another way, the embodiment of FIG. 2 may be described as a landscaping apparatus or system 30 for inhibiting plant growth on the ground, the system 30 containing a member 31 containing an elongated strip having a longitudinal axis and sides spaced apart from the longitudinal axis, wherein the longitudinal axis and the sides are substantially within a plane containing the member 31 when the member 31 is substantially flat. One or more orifices 39 may be formed in the member 31. One or more shanks 41 are also provided and separately formed from the member 31, wherein each shank 41 is received within a corresponding respective orifice 39 of the one or more orifices. By driving a shank 41 through a corresponding orifice 39, the member may thereby be secured flat against, or contoured against the ground. All embodiments of the present invention essentially secure the member against the ground to cover a desired area.

Figure 5:
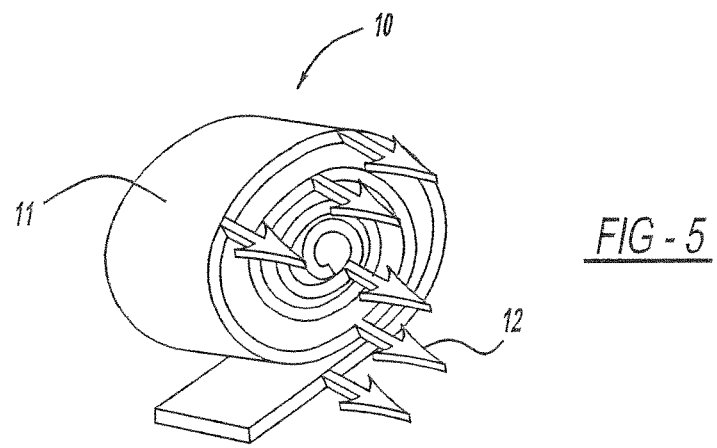
FIG. 5 is an isometric view of the embodiment of FIG. 1 when it is rolled up for shipping, etc.

Referring to FIG. 5, substantially flexible landscaping apparatus 10 having a plurality of projections 12 is shown rolled up, for efficiency of space for shipping, transportation, storage, etc. If member 11 is fairly resilient, the invention may be rolled up tightly, beginning with relatively small diameter loops for the member. Or if the material selected for the member is somewhat less resilient it may be rolled up beginning with relatively larger diameter loops.

Figure 6:
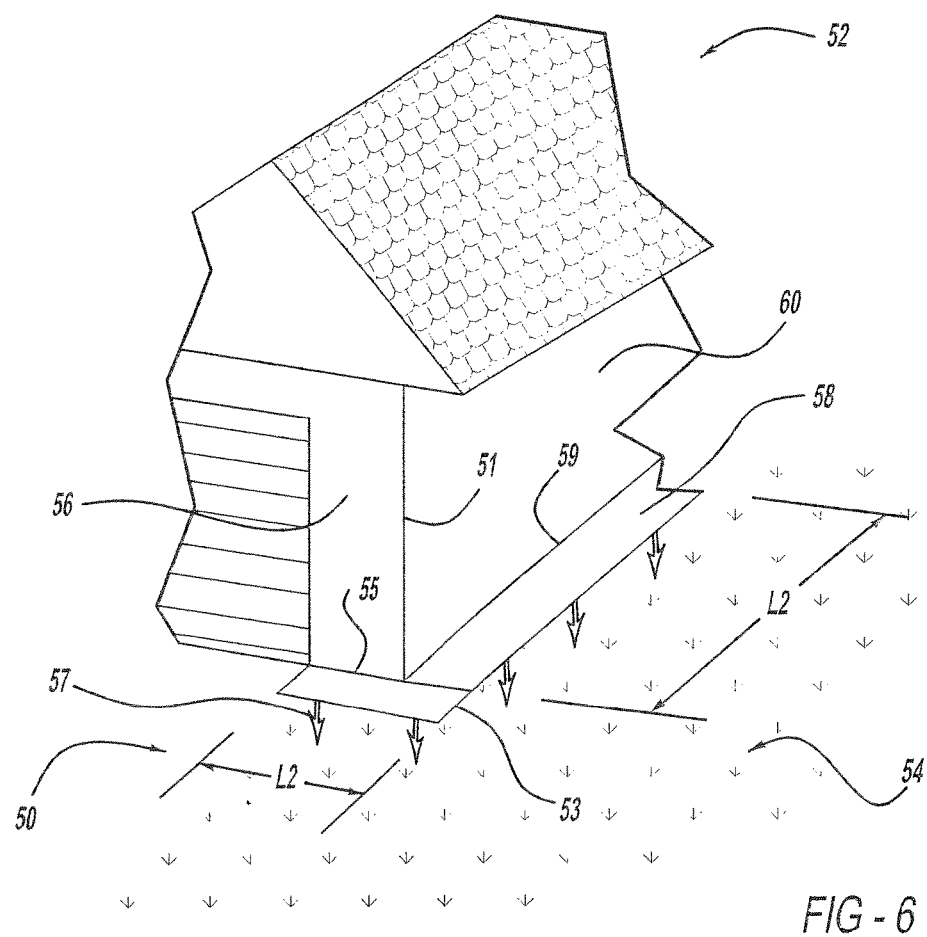
FIG. 6 is an isometric view of the embodiment of FIG. 1 after installing it as a skirt around the corner of a building.

Referring to FIG. 6, the invention is seen after installing it as skirt 50 around corner 51 of building 52. First member 53 has been cut by a user of the landscaping apparatus to first selected length $L_1$, and substantially secured to ground 54 (with one side 55 substantially abutting first wall 56 of the building) by pushing the projections 57 into the ground. Also second member 58 has been cut by the user to second selected length $L_2$, and substantially secured to the ground in a similar fashion with one side 59 substantially abutting second wall 60.

Figure 7:
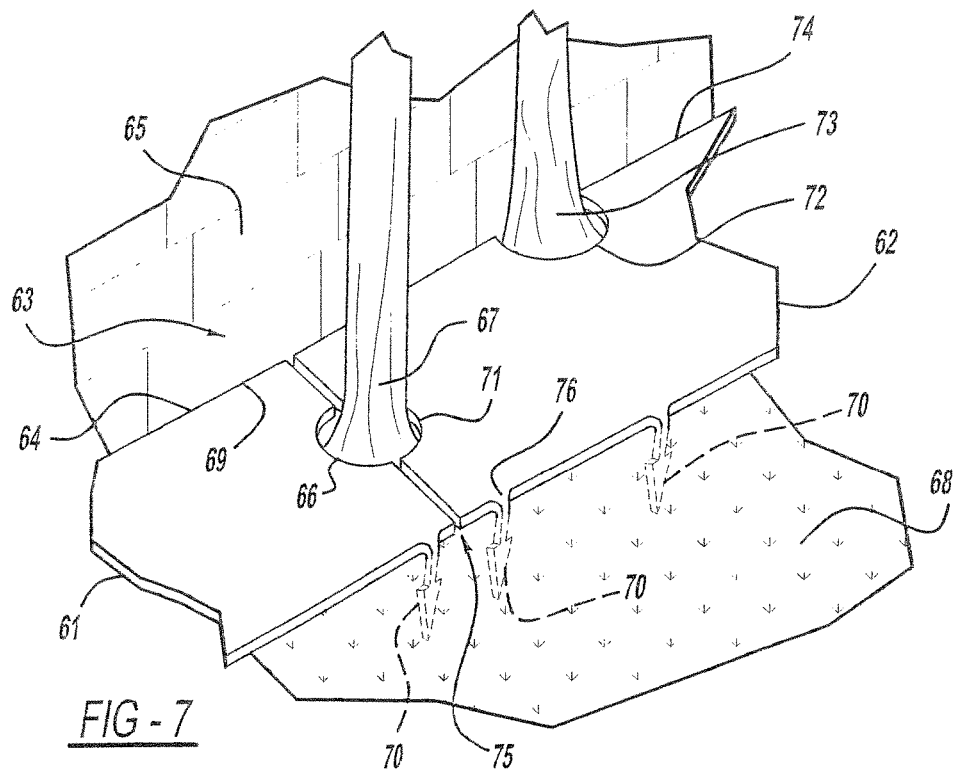
FIG. 7 is an isometric view of the embodiment of FIG. 1 after installing it as a skirt along the bottom of a wall of a building.

Referring to FIGS. 1, 3 and 7, first and second sections 61, 62, respectively, of the invention are seen after installing them as skirt 63 along bottom 64 of wall 65 of a building (not shown). At least one removable portion that was scored on first section 61 has been removed at 66 by a user so that the first section substantially abuts first obstacle 67 in the intended path (not shown) for the first section along ground 68. First section 61 has been substantially secured to the ground with side 69 substantially abutting the wall by pushing plurality of projections 70 into the ground. At least one removable portion that was scored on second section 62 has been removed at 71, 72, respectively, by the user so that the second section substantially abuts first obstacle 67 and second obstacle 73 in the intended path (not shown) for the second section along ground 68. Second section 62 has been substantially secured to the ground with side 74 substantially abutting wall 65 by pushing plurality of projections 70 into the ground. The first and second obstacles can be any combination of trees, shrubs, flowers, rocks, etc. The first and second sections substantially abut each other at 75. At least one removable portion 24 may be scored substantially centrally on member 11 for substantially abutting an obstacle (not shown). Access line 25 may be prescored on the member, or cut by the user with scissors, to permit forming the member around a tree, rock, etc. Furthermore as indicated at 76, the projections for the embodiment of FIG. 7 were integrally formed with and initially in the plane (not shown) of the second section, for example. This would be prior to forming the projections substantially perpendicular to the plane, so that the plurality of projections extend from the member in the same direction.

Figure 8:
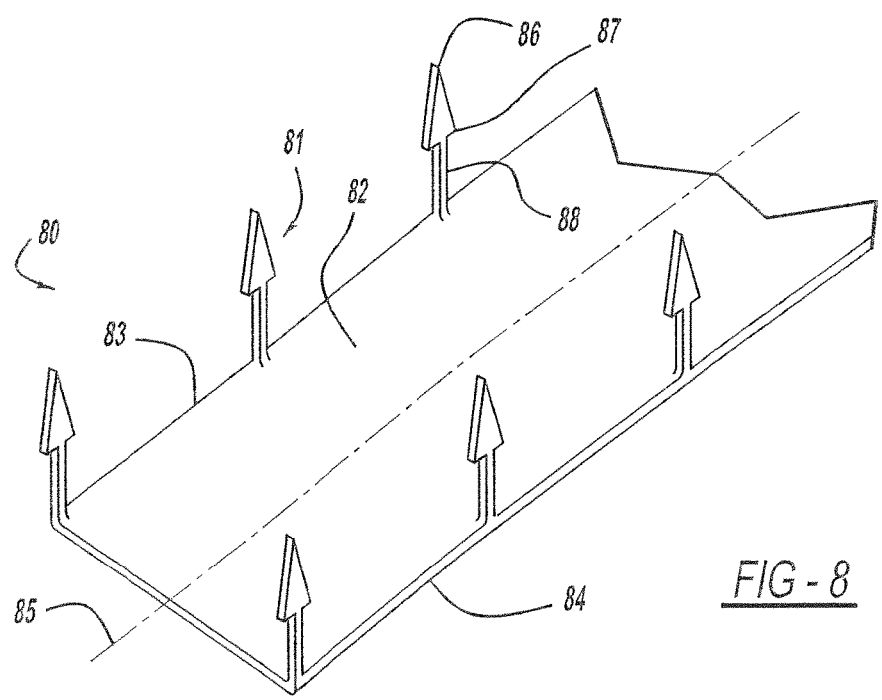
FIG. 8 is an isometric view of another embodiment of the invention.
Figure 10:
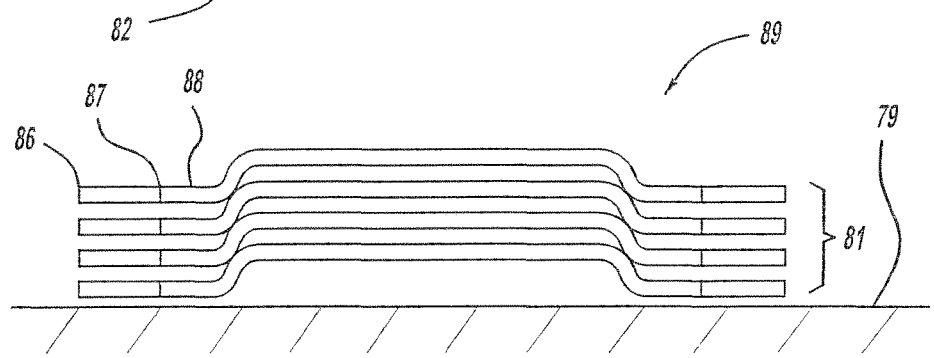
FIG. 10 is an end view of a plurality of stacked sections for the embodiment of FIG. 8.

In another embodiment, referring to FIG. 8, the invention 80 comprises a plurality of projections 81, at least a portion of which are substantially outside the plane (not shown) of member 82. For this embodiment, forming the projections prior to substantially securing the invention to the ground is not required. The portion of the projections may be substantially perpendicular to the plane and extend from the member in the same direction, or the projections may be at an oblique angle or angles. The portion of the projections may extend from sides 83, 84, respectively, of the member, or may be located inboard (not shown) from the sides at a selected distance from longitudinal axis 85 of the member, distributed in a patterned or nonpatterned fashion, etc. For the embodiment of FIG. 8, the landscaping apparatus may be made from a substantially rigid material which is selected from the group consisting of polymers and metals. The invention may also be made from a substantially rigid material such as wood that has been chemically treated for outdoor use with chromated copper arsenate, ammonium copper quaternary, copper boron azole, or any other known preservative. The invention may also be made from materials which are resilient enough to permit the projections to flex outwardly (i.e. away from the longitudinal axis) in varying degrees as shown in FIG. 10 when sections 89 are stacked on ground 79. (Or to flex outwardly when the member of FIG. 8 is rolled up.) Such resilient materials may also tend to exhibit a "shape memory," permitting the projections to spring back and substantially return to their orientation as-formed during manufacturing (such as outside the plane of the member, substantially perpendicular to the plane, etc.).

Figure 9:
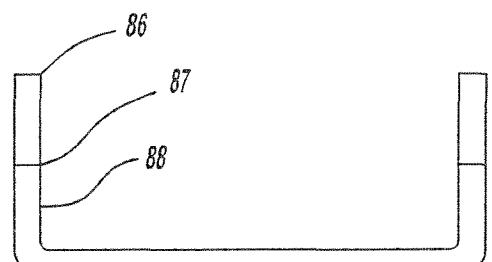
FIG. 9 is an end view of the embodiment of FIG. 8.

Referring to FIG. 9, an end view of the embodiment of FIG. 8 is seen. Each projection 81 is comprised of a penetrating tip 86, a barb portion 87 and a shank portion 88.

Referring to FIGS. 11-14, another embodiment of the invention is shown in which first member 90 comprises elongated strip 91 having longitudinal axis 92. The longitudinal axis is substantially within a plane (not shown) containing first member 90 when the first member is substantially flat. At least one channel 93 is connected to first member 90 by being integrally formed or molded with 90, by using adhesive, etc. A second channel may be included at 94. For purposes of illustration, another second member 105, described further herein, is shown inserted or "snapped" into second channel 94 in FIG. 11. Channel 93 is substantially parallel to longitudinal axis 92, although other orientations are contemplated by the invention, such as perpendicular to 92. Second member 95 comprises elongated rod 96 having plurality of projections 97, wherein second member 95 may be inserted into channel 93. Each projection is comprised of a penetrating tip 99, a barb portion 100 and a shank portion 101. Plurality of projections 97 may have at least a portion of its projections substantially outside the plane when second member 95 is inserted into channel 93. This insertion occurs when a user of the invention presses second member 95 into channel 93 by moving 95 in the direction indicated by arrows at A. For example, referring to FIG. 12, the at least the portion of the projections may be substantially perpendicular to the plane when the second member is inserted into the channel. Referring again to FIG. 12, the channel further comprises at least one feature 98 for substantially retaining second member 95 within the channel when it is inserted into or "snapped into" the channel. Feature 98 may be designed to permit the second member to be removed and reinserted into the first member repeatedly. Alternatively, feature 98 may be designed to permit the second member to be inserted substantially once, in a permanent or semipermanent fashion. Feature 98 provides lateral support, for example, to shank portions 101 so that the projections remain located substantially outside (for example, substantially perpendicular to) the plane when the second member is inserted in the channel.

Figure 12:
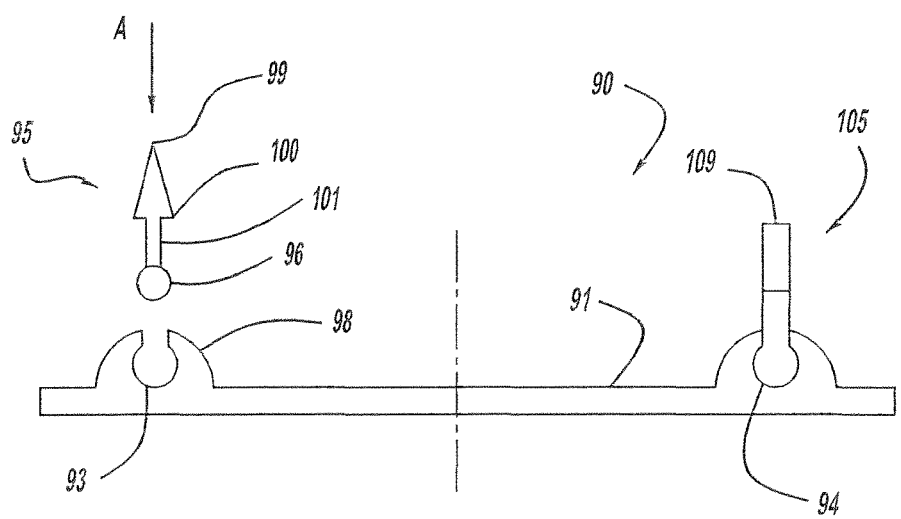
FIG. 12 is an end view of the embodiment of FIG. 11.
Figure 11:
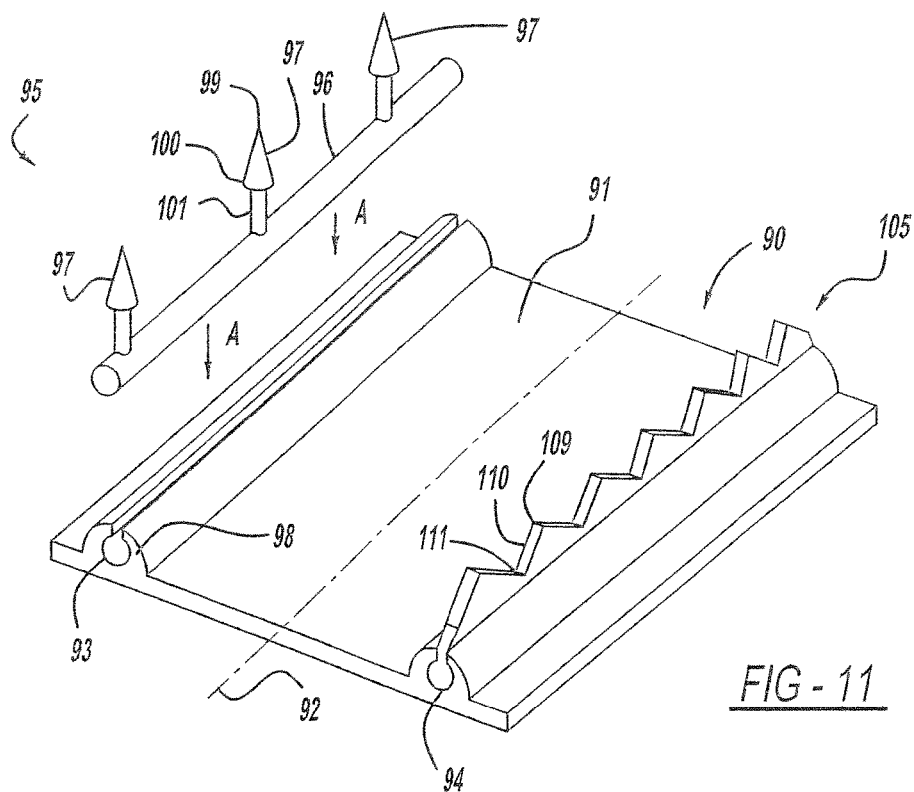
FIG. 11 is an isometric view of another embodiment of the invention.
Figure 13:
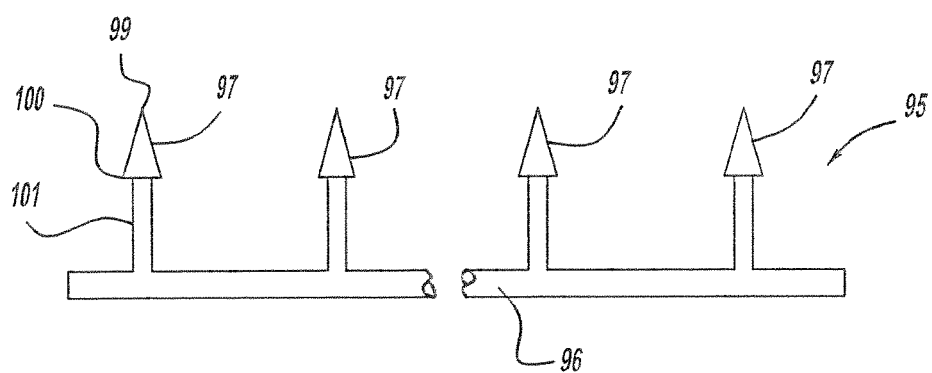
FIG. 13 is a side view of a second member having a plurality of projections for the embodiment of FIGS. 11-12.

FIG. 13 is a side view of second member 95 for the embodiment of FIGS. 11-12. Second member 95 comprises elongated rod 96 having plurality of projections 97 extending therefrom in substantially the same direction. Projections 97 may be integrally formed with second member 95. Alternatively, the projections may be welded, adhered or otherwise mechanically fastened to the second member. Projections 97 are substantially shaped as arrowheads or barbs. Each projection is comprised of a penetrating tip 99, a barb portion 100 and a shank portion 101.

Figure 14:
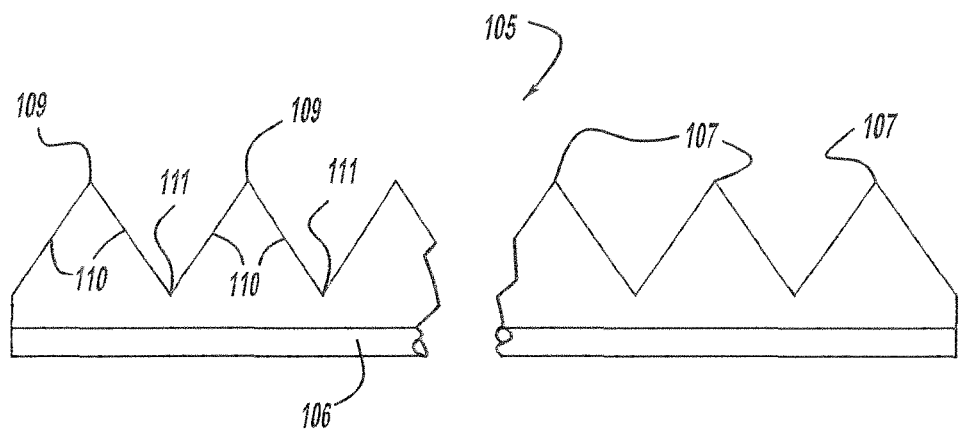
FIG. 14 is a side view of another second member having a plurality of projections for the embodiment of FIGS. 11-12.

FIG. 14 is a side view of another second member 105 for the embodiment of FIGS. 11-12. Second member 105 comprises elongated rod 106 having plurality of projections 107 extending therefrom in substantially the same direction. Projections 107 may be integrally formed with second member 105. Alternatively, the projections may be welded, adhered or otherwise mechanically fastened to the second member. Projections 107 are substantially shaped as sawteeth. Each projection is comprised of a penetrating tip 109, intermediate portions 110 and valley portions 111.

Figure 15:
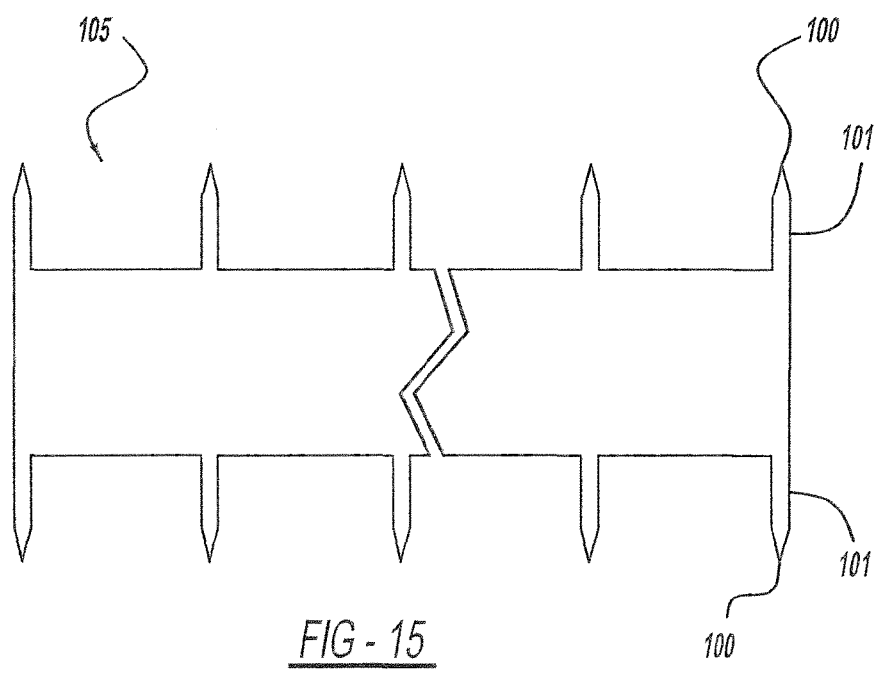
FIG. 15 is a top view of another embodiment of the invention having shanks with a respective pointed end on each shank.

FIG. 15 is a top view of another embodiment, wherein a member 105 contains shank portions 101, each shank portion having a respective pointed end portion 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A landscaping apparatus for inhibiting plant growth on ground, comprising:
    a member comprising an elongated strip having a longitudinal axis and sides spaced apart from the longitudinal axis, wherein the longitudinal axis and the sides are substantially within a plane containing the member when the member is substantially flat;
    a removable portion contained within the member; and
    a plurality of projections extending from the member, wherein the projections are integrally formed with the member, and, all of the projections extend substantially orthogonal to the member when the apparatus is installed.

2. The landscaping apparatus of claim 1, wherein the sides are substantially parallel to the longitudinal axis and said member has two or more removable portions.

3. The landscaping apparatus of claim 1, wherein the plurality of projections has at least a portion of the projections substantially within the plane and extending from the sides in a direction away from the longitudinal axis.

4. The landscaping apparatus of claim 1, wherein the member is made from a substantially flexible material.

5. The landscaping apparatus of claim 4, wherein the material is selected from the group consisting of polymers and metals.

6. The landscaping apparatus of claim 1, wherein the plurality of projections has at least a portion of the projections substantially outside the plane.

7. The landscaping apparatus of claim 6, further wherein the at least the portion of the projections are substantially perpendicular to the plane and extend from the member in the same direction.

8. The landscaping apparatus of claim 7, further wherein the at least the portion of the projections extend from the sides.

9. The landscaping apparatus of claim 6, wherein the member is made from a substantially rigid material.

10. The landscaping apparatus of claim 9, wherein the material is selected from the group consisting of polymers and metals.

11. The landscaping apparatus of claim 1, wherein the member further comprises at least one removable portion scored on the member, wherein the at least one removable portion may be selectively removed by a user of the landscaping apparatus so that the member substantially abuts an obstacle in an intended path for the member along the ground.

12. The landscaping apparatus of claim 1, wherein the projections are substantially shaped as barbs.

13. The landscaping apparatus of claim 1, wherein the projections are substantially shaped as sawteeth.

14. The landscaping apparatus of claim 1, wherein the removable portion is a scored portion for removal from said member.

15. The landscaping apparatus of claim 1, wherein the member further comprises at least one aperture, wherein the at least one aperture facilitates the use of at least one anchor to substantially secure the landscaping apparatus to the ground.

16. The landscaping apparatus of claim 1, further comprising at least one anchor to substantially secure the landscaping apparatus to the ground.

17. A landscaping apparatus for inhibiting plant growth on ground, comprising:
- a member comprising a longitudinal axis and sides spaced apart from the longitudinal axis, wherein the longitudinal axis and the sides are substantially within a plane containing the member when the member is substantially flat;
- a removable portion contained within the member; and
- a plurality of projections extending from the member, thereby securing the member substantially flat against the ground when the apparatus is installed,
- wherein all of the projections extend substantially orthogonal to the member when the apparatus is installed.

18. The landscaping apparatus of claim 17 wherein said apparatus further comprises:
- one or more orifices formed in said member;
- one or more shanks, wherein each shank is received within a corresponding respective orifice of said one or more orifices, for securing said member to the ground.

* * * * *